3,523,803
MANUFACTURE OF BOROSILICATE GLASS FIBERS
Claude Haslay, Agnetz, and Jean Paymal, Clermont, France, assignors to Compagnie de Saint-Gobain, Neuilly-sur-Seine, France
No Drawing. Filed Apr. 27, 1965, Ser. No. 451,334
Claims priority, application France, Apr. 29, 1964, 972,775
Int. Cl. C03c 13/00
U.S. Cl. 106—50     15 Claims

ABSTRACT OF THE DISCLOSURE

Glass fibers having good water resistance, specific surface, viscosity, resistance to chemicals, speed of devitrification, temperature of fusion, crystallization, density and thermal conductivity. The fibers being of a glass having a composition by weight within the ranges 46–60% $SiO_2$, 3–8% $B_2O_3$, 5–12% $Al_2O_3$, 1–5% $ZrO_2$, 0–6% $TiO_2$, 4.5% CaO, 1.5–2.7% MgO, 1–4% BaO, 2–9% ZnO, 6–7.8% $Na_2O$, 1.5–3.5% $K_2O$, 0.2% $Li_2O$, 1–3.5% F in which the sum of the alkali metal oxides is between 9 and 11.5%, and the ratio of the sum of alumina, zirconia and titania to alkali metal oxides is between 1 and 1.5, and the ratio of alkaline earth oxides to alkali metal oxides is between 0.6 and 1.1 and the ratio of baria to lime is between 0.1 and 0.5.

---

This invention relates to the manufacture of glass fibers and has particular relation to a superior composition for the manufacture of such glass, and to the novel glass. The invention also relates to fibers made from such glass.

Glass fibers are made by several methods of manufacture, in one of which the molten glass issues from a fixed spinnerette and is shredded into fibers by a blast of air. In another system the molten glass is dropped on a rapidly rotating plate and is drawn out and flung away from the surface of the plate in the form of fibers. In a more recent development the glass is extruded through apertures in the side of a centrifugal spinner and is attenuated by a ring-shaped blast of hot gas as it issues from the orifices.

The types of glass which can be used successfully and satisfactorily in these operations is extremely limited, and the reasons for the limitation are well understood. Many glasses when fibered are attacked by water or chemicals, others are corrosive to machinery with which they come in contact and give short life to the refactories and metals, others have a viscosity at working temperature which is too high, some are too expensive both in their ingredients and in the temperatures at which they are made and fibered, others are so high melting that they must be worked at temperatures near the flow point of most refractory steels, others lose ingredients by evaporation at the temperatures of the process, and others devitrify and block the orifices of the spinner.

As a result of these manifold imperfections the industry has largely worked with a composition called E glass, the percentage composition of which, in weight percent, is about as follows: $SiO_2$, 54.5%, $Al_2O_3$ 14.5%, CaO 17%, MgO 4.5%, $B_2O_3$ 8.5%, $Na_2O$, $K_2O$, $TiO_2$, $Fe_2O_3$, the total of the last four is about 1%. This is, for many purposes, the best glass known for fibering but it has a number of the foregoing imperfections. It is consequently an object of this invention to provide a better glass which will not stagnate in the cold zones of the apparatus, which will not undergo alteration by the vaporization of ingredients, which will have better insulating power at given sizes than is furnished by the present glass fibers, at 3–4 m$\mu$ for example, providing better insulation than E glass for similar sizes, which will substantially reduce the cost of the glass, lower its corrosiveness, increase its resistance to water and other media, lengthen the life of rotary spinners and fixed spinnerettes, and lower the cost of heat used in preparing the glass and spinning it.

The objects of the invention are accomplished, generally speaking, by a family of glass which have the following composition by weight percent:

LIMITS $SiO_2$—46–60% and preferably 48–58%
$B_2O_3$—3–8% and preferably 3–8%
$Al_2O_3$—5–12% and preferably 8–12%
$ZrO_2$—1–5% and preferably 2–4%.
$TiO_2$—0–6% and preferably 0–2%
CaO—4.5–10% and preferably 6.7–9%
MgO—1.5–2.7% and preferably 1.9–2.7%
BaO—1–4% and preferably 1.5–3.7%
ZnO—2–9% and preferably 3–7%
$Na_2O$—6–7.8% and preferably 7–7.8%
$K_2O$—1.5–3.5% and preferably 1.8–3.2%
$Li_2O$—0–2% and preferably 0.1%
F—1–3.5% and preferably 1.25–2.5% and which have the following additional requirements:
The ratio $$\frac{CaO+MgO}{Na_2O+K_2O+Li_2O}$$

is in the range .6–1.1. This produces a range of working conditions which imparts a high tractive strength to the fibers. The total of $Na_2O+K_2O+Li_2O$ is in the range 9–11.5%. This produces viscosities which are relatively low under working conditions and produces a fiber which is strongly resistant to attack by water and chemicals. The ratio $$\frac{Al_2O_3+ZrO_2+TiO_2}{Na_2O+K_2O+Li_2O}$$

is in the range 1–1.5%. This imparts great resistance to change in physical or chemical structure.

The presence of zinc oxide is essential, especially in its range of 2–9%. It is our discovery that without this content of zinc the glass tends to lack sufficient fluidity at high temperature and that it aids in imparting good resistance to alteration. Resistance to alteration and ease of fusion are also imparted by the indicated percentages of $B_2O_3$. A minimum of 3% of $B_2O_3$ is necessary to establish the excellent resistance of the glass to alteration. If the upper temperature of devitrification is to be lowered with out affecting attackability of the glass, the content of BaO should not be greater than the upper limit of its range as stated in the table.

The glasses of this family which contain the most lime tend to have less perfect qualities of devitrification but the presence of BaO compensates for that imperfection. The results are obtained with the ratio of BaO to CaO in the range about .1–.5. A particular advantage rises from the fact that in this glass the ratio $K_2O/Al_2O_3$ lies between .3 and .4, which makes phonolite useful as a source of alumina. Another novel characteristic of the invention is that the ratio of MgO/CaO lies advantageously between .2 and .3 which makes dolomite available as a source of MgO and CaO. If the fluoride is introduced as calcium fluoride, the compositions which contain the most fluorine will have a ratio of MgO/CaO near .2 and, inversely, those containing the least fluoride will have a ratio of MgO/CaO nearer to .3.

The following table gives, as non-limiting examples, analyses of glasses of this invention which are particularly useful together with their temperatures of fusion and their characteristics of viscosities, devitrification and resistance to alteration by water. In making glass II of the table the following ingredients were mixed: sand 28.96 kg., phonolite 38.37 kg., dolomite 9.26 kg., Desybor, anhydrous rasorite 6.82, fluorspar 6.40 kg., zirconiferous sand 5.59 kg., barium carbonate 4.78 kg., sodium carbonate 3.16 kg., sodium sulphate 0.50 kg., zinc oxide 4.18 kg., rutile 1.94 kg. and wood charcoal 0.031 kg.

The mixture was fused at 1375–1395° C. The mean fibering temperature in the centrifugal spinner used was about 1155° C., and in the blast outside the spinner about 1584° C. The glass was supplied to the spinner at about 3 metric tons a day. The spinner was platinum rhodium having a wall with 6000 apertures. The blast velocity was about 200 m./s.

The mean diameter of the fibers was 3.1 microns. Their resistance to traction was 569 g. of force per g. of product. After 30 minutes in an autoclave at 107° C. this was reduced to 383 g. of force per g. of product. Thermal conductivity of the product was $\lambda = 32.10^{-3}$ @ 23.9° C. Other values for the products are to be found in the table.

The other examples of the tables of this specification were made under similar conditions and yielded comparable products, demonstrating the common utility of this family of glasses for the manufacture of fibers and pellicular bodies.

| Ingredients | Examples | | | | | |
|---|---|---|---|---|---|---|
| | I | II | III | IV | V | VI |
| $SiO_2$ | 55.5 | 50.7 | 56.7 | 50.4 | 48.8 | 51.7 |
| $Fe_2O_3$ | 0.6 | 1.0 | 1.0 | 1.2 | 1.0 | 1.1 |
| $Al_2O_3$ | 5.6 | 8.6 | 8.1 | 9.8 | 9.7 | 10.0 |
| $CaO$ | 8.5 | 8.3 | 8.7 | 5.6 | 6.7 | 6.7 |
| $MgO$ | 1.9 | 1.9 | 2.4 | 2.6 | 2.1 | 2.1 |
| $Na_2O$ | 7.8 | 7.5 | 7.3 | 7.7 | 7.7 | 7.7 |
| $K_2O$ | 1.9 | 3.0 | 3.0 | 3.0 | 2.6 | 3.2 |
| $Li_2O$ | | | | | | 0.5 |
| $B_2O_3$ | 4.5 | 4.4 | 3.0 | 8.0 | 7.4 | 7.5 |
| $BaO$ | 3.8 | 3.7 | 1.7 | 2.6 | 2.7 | 2.7 |
| $ZrO_2$ | 3.8 | 3.7 | 3.0 | 2.1 | 1.9 | 2.1 |
| $TiO_2$ | 2.0 | 1.9 | | | | |
| F | 2.5 | 1.8 | 2.3 | 1.5 | 1.8 | 1.6 |
| $ZnO$ | 2.1 | 3.8 | 3.8 | 5.7 | 7.8 | 3.8 |
| $\dfrac{CaO+MgO}{Na_2O+K_2O+Li_2O}$ | 1.07 | 0.97 | 1.07 | 0.76 | 0.85 | 0.60 |
| $\dfrac{Al_2O_3+ZrO_2+TiO_2}{Na_2O+K_2O+Li_2O}$ | 1.17 | 1.35 | 1.09 | 1.10 | 1.16 | 1.06 |
| Temperature of fusion, °C | 1,380 | 1,350 | 1,370 | 1,320 | 1,320 | 1,320 |
| Softening temp., deg | 592 | 602 | 604 | 570 | 572 | 567 |
| Viscosity (log η) to— | | | | | | |
| 1,000° C | 3.59 | 3.59 | 3.96 | 3.47 | 3.32 | 3.41 |
| 1,050° C | 3.23 | 3.21 | 3.57 | 3.12 | 2.99 | 3.08 |
| 1,100° C | 2.92 | 2.89 | 3.24 | 2.82 | 2.70 | 2.80 |
| Devitrification Upper limit (deg.) | 980 | 1,000 | 1,040 | 990 | 990 | 990 |
| Temp. of maximum (deg.) | 820 | 860 | 860 | 880 | 870 | 880 |
| Maximum speed in microns per minute | 0.4 | 0.25 | 0.6 | 0.15 | 0.15 | 0.25 |
| Resistance to alterability: | | | | | | |
| Mg | 5.8 | 4.8 | 4.7 | 4.3 | 4.4 | 5.3 |
| Alkalis, percent | 1.5 | 1.2 | 1.1 | 0.9 | 0.9 | 0.9 |

These glasses are particularly available for the making of glass fibers, especially for making them by centrifugal processes. They have exceptional value, too, in the manufacture of continuous lengths of filament for use in textiles. In making textiles it is frequently desirable to prepare very clear glasses and in such cases it is desirable to use raw materials which are low in coloring agents such as iron oxide and titanium. All the glasses which are within this family may be used for these purposes, but it is known that titanium tends to produce a yellow color which is affected in hue by the other elements present. If it is preferred that the dominant tone in clear glass should be blue or green and not yellow, it is permissible to omit the titanium. The following glasses contain no titanium, the iron oxide is less than .1% and they are entirely satisfactory for these uses, especially in centrifugal spinning.

| Glasses | VII | VIII |
|---|---|---|
| $SiO_2$ | 57.00 | 52.00 |
| $Fe_2O_3$ | 0.08 | 0.05 |
| $Al_2O_3$ | 8.10 | 9.80 |
| $CaO$ | 8.70 | 7.30 |
| $MgO$ | 2.45 | 2.45 |
| $Na_2O$ | 7.25 | 7.40 |
| $K_2O$ | 3.05 | 3.80 |
| $B_2O_3$ | 3.25 | 7.85 |
| $BaO$ | 1.70 | 2.70 |
| $ZrO_2$ | 3.00 | 2.00 |
| F | 2.30 | 1.25 |
| $ZnO$ | 3.80 | 3.40 |

All of the glasses within the present family have great resistance to water attack and to attack by chemical agents. They have little corrosive effect on the materials with which they come in contact during manufacture. Their viscosities are low, being only 1000–3000 poises at temperatures between 1000–1050° C. Their cost is lower than the useful glasses of the prior art because their raw materials are less expensive and the cost of melting is less. Outside of the economy of their ingredients they have a low temperature of fusion which reduces the cost of manufacture and the size of the furnace employed. Their working viscosities are low enough to enable the apparatus to be fitted with special steels in the fibering machines, which is not presently an available practice, the temperatures presently employed being close to the flow point of ordinary resistant steels.

The new glasses have the advantage of a maximum speed of devitrification equal to or less than .6 mu per minute, which reduces the tendency to devitrify. The prior art glasses had higher speeds of devitrification and frequently crystallized at a rate sufficient to block apertures of the extrusion apparatus, but the new glasses do not have this fault and produce correct fibering.

The great resistance of the new fibers to attackability by water or to chemical agents is essential for glasses destined to the production of fibers of small diameters. They are therefore particularly advantageous for the production of insulating, light fibers and this insulating power is so great that fibers having a mean diameter of 3–4 mu when attached to one another by a convenient adherence will have, for a density of 10 kg./m.³, a thermal coefficient of conductability of $35.10^{-3}$ kcal./m.h. ° C. or have a density of 16 kg./m.³, a coefficient of thermal conductivity of $31.10^{-3}$ kcal./m.h. ° C. or for a density of 30 kg./m.³, a coefficient of thermal conductivity of $28.10^{-3}$ kcal./m.h. ° C. The bonding agent used may be thermohardening phenol-formaldehyde resins, or even better, a copolymer of urea with a phenol-formaldehyde resin or a copolymer of melamine with a phenol-formaldehyde resin. The use of such bonding agents is not part of the present invention. With or without such bonding agents the fibers may be joined by bringing them together at their points of intersection.

The use of glass according to the invention is not limited to the production of fibers destined to make insulating materials but includes making all fibers of fine diameter and all products of great specific surface with respect to the volume of the material, such as thin plates and films. In particular, these glasses may also be used in the mineral textile industry to produce continuous fibers susceptible of being made into tissues. For this purpose it is advisable to use platinum spinnerettes which are either directly supplied with molten glass or in which the glass is melted in pieces, portions or chunks. When this is done a principal advantage is obtained from the use of the present glasses which, for textile fibers, cost about ⅓ less than the commonly used E glass. The cost of fusion and the cost of maintaining the fibering instruments are reduced, especially because of the lower viscosity of the new glass and of working at somewhat lower temperatures.

As many apparently widely different embodiments of the present invention may be made without departing from the spirit and scope thereof, it is to be understood that the invention is not limited to the specific embodiments.

What is claimed is:

1. Glass, adapted to the centrifugal spinning of fibers, having the composition in weight percent:

| | |
|---|---|
| $SiO_2$ | 48.8–56.7 |
| $B_2O_3$ | 3–8 |
| $Al_2O_3$ | 8.1–9.8 |
| $ZrO_2$ | 1.9–3.8 |
| $TiO_2$ | 0–2.0 |
| CaO | 5.6–10.0 |
| MgO | 1.9–2.45 |
| BaO | 1.7–3.8 |
| ZnO | 2.1–7.8 |
| $Na_2O$ | 7.25–7.8 |
| $K_2O$ | 1.9–3.8 |
| $Li_2O$ | 0.0–0.5 |
| F | 1.25–2.3 | in which $Na_2O+K_2O+Li_2O$ is within the range 9 to 11.5%, the ratio $$\frac{Al_2O_3+ZrO_2+TiO_2}{Na_2O+K_2O+Li_2O}$$

is within the range 1 to 1.5, the ratio $$\frac{CaO+MgO}{Na_2O+K_2O+Li_2O}$$

is within the range of .6 to 1.1, and the ratio BaO/CaO is within the range 0.1 to 0.5.

2. Glass, adapted to the centrifugal spinning of fibers, having the composition in weight percent:

| | |
|---|---|
| $SiO_2$ | 48–58 |
| $B_2O_3$ | 3–8 |
| $Al_2O_3$ | 8–12 |
| $ZrO_2$ | 2–4 |
| $TiO_2$ | 0–2 |
| CaO | 6.7–9 |
| MgO | 1.9–2.7 |
| BaO | 1.5–3.7 |
| ZnO | 3–7 |
| $Na_2O$ | 7–7.8 |
| $K_2O$ | 1.8–3.2 |
| $Li_2O$ | 0–1 |
| F | 1.25–2.5 | in which $Na_2O+K_2O+Li_2O$ is within the range 9 to 11.5%, the ratio $$\frac{Al_2O+ZrO_2+TiO_2}{Na_2O+K_2O+Li_2O}$$

is within the range 1 to 1.5, the ratio $$\frac{CaO+MgO}{Na_2O+K_2O+Li_2O}$$

is within the range of .6 to 1.1, and the ratio BaO/CaO is within the range 0.1 to 0.5.

3. Glass, adapted to centrifugal spinning of fibers, having the composition in weight percent:

| | |
|---|---|
| $SiO_2$ | 56.7 |
| $Fe_2O_3$ | 1.0 |
| $Al_2O_3$ | 8.1 |
| CaO | 8.7 |
| MgO | 2.4 |
| $Na_2O$ | 7.3 |
| $K_2O$ | 3.0 |
| $B_2O_3$ | 3.0 |
| BaO | 1.7 |
| $ZrO_2$ | 3.0 |
| F | 2.3 |
| ZnO | 3.8 |

4. Glass, adapted to centrifugal spinning of fibers having the composition, in weight percent:

| | |
|---|---|
| $SiO_2$ | 48.8 |
| $Fe_2O_3$ | 1.0 |
| $Al_2O_3$ | 9.7 |
| CaO | 6.7 |
| MgO | 2.1 |
| $Na_2O$ | 7.7 |
| $K_2O$ | 2.6 |
| $B_2O_3$ | 7.4 |
| BaO | 2.7 |
| $ZrO_2$ | 1.9 |
| F | 1.8 |
| ZnO | 7.8 |

5. Glass, adapted to centrifugal spinning of fibers, having the composition, in weight percent:

| | |
|---|---|
| $SiO_2$ | 51.7 |
| $Fe_2O_3$ | 1.1 |
| $Al_2O_3$ | 10.0 |
| CaO | 6.7 |
| MgO | 2.1 |
| $Na_2O$ | 7.7 |
| $K_2O$ | 3.2 |
| $Li_2O$ | 0.5 |
| $B_2O_3$ | 7.5 |
| BaO | 2.7 |
| $ZrO_2$ | 2.1 |
| F | 1.6 |
| ZnO | 3.8 |

6. Glass, adapted to centrifugal spinning of fibers, having the composition, in weight percent:

| | |
|---|---|
| $SiO_2$ | 57.00 |
| $Fe_2O_3$ | 0.08 |
| $Al_2O_3$ | 8.10 |
| CaO | 8.70 |
| MgO | 2.45 |
| $Na_2O$ | 7.25 |
| $K_2O$ | 3.05 |
| $B_2O_3$ | 3.25 |
| BaO | 1.70 |
| $ZrO_2$ | 3.00 |
| F | 2.30 |
| ZnO | 3.80 |

7. Glass, adapted to centrifugal spinning of fibers, having the composition, in weight percent:

| | |
|---|---|
| $SiO_2$ | 52.00 |
| $Fe_2O_3$ | 0.5 |
| $Al_2O_3$ | 9.80 |
| CaO | 7.30 |
| MgO | 2.45 |
| $Na_2O$ | 7.40 |
| $K_2O$ | 3.80 |
| $B_2O_3$ | 7.85 |
| BaO | 2.70 |
| $ZrO_2$ | 2.00 |
| F | 1.25 |
| ZnO | 3.40 |

8. Glass, adapted to the centrifugal spinning of fibers, having the composition in weight percent:

| | |
|---|---|
| $SiO_2$ | 46–60 |
| $B_2O_3$ | 3–8 |
| $Al_2O_3$ | 5–12 |
| $ZrO_2$ | 1–5 |
| $TiO_2$ | 0–6 |
| CaO | 4.5–10 |
| MgO | 1.5–2.7 |
| BaO | 1–4 |
| ZnO | 2–9 |
| $Na_2O$ | 6–7.8 |
| $K_2O$ | 1.5–3.5 |
| $Li_2O$ | 0–2 |
| F | 1–3.5 | in which $Na_2O+K_2O+Li_2O$ is within the range 9 to 11.5% the ratio $$\frac{Al_2O_3+ZrO_2+TiO_2}{Na_2O+K_2O+LiO_2}$$

is within the range 1 to 1.5, and the ratio $$\frac{CaO+MgO}{Na_2O+K_2O+Li_2O}$$

is within the range .6 to 1.1, and the ratio BaO/CaO is within the range .1 and .5.

9. Glass fibers having been formed of a glass having the composition as set forth in claim 1.

10. Glass fibers formed of the glass having the composition set forth in claim 2.

11. Glass fibers formed of a glass having the composition as set forth in claim 3.

12. Glass fibers formed of a glass having the composition as set forth in claim 4.

13. Glass fibers having the composition of glass as set forth in claim 8.

14. Glass fibers formed of a glass having the composition set forth in claim 7.

15. Glass fibers having the composition of the glass set forth in claim 5.

References Cited

UNITED STATES PATENTS

| | | | |
|---|---|---|---|
| 2,877,124 | 3/1959 | Welsch | 106—54 |
| 3,013,888 | 12/1961 | Lajarte | 106—50 |
| 3,085,887 | 4/1963 | Labino et al. | 106—50 |
| 3,095,311 | 6/1963 | Wranau et al. | 106—50 |
| 3,166,428 | 1/1965 | Thomas | 106—50 |

FOREIGN PATENTS 1,322,725  2/1963  France.

OTHER REFERENCES

Kingery, N. D., Introduction to Ceramics, New York, R. W. Wiley & Sons, Inc., 1960, pp. 574–577.

HELEN M. McCARTHY, Primary Examiner

W. R. SATTERFIELD, Assistant Examiner

U.S. Cl. X.R.

65—2; 106—54